United States Patent Office 3,689,468
Patented Sept. 5, 1972

3,689,468
UNSATURATED QUATERNARY MONOMERS AND POLYMERS
Harry J. Cenci, Warminster, and Travis E. Stevens, Ambler, Pa., assignors to Rohm and Haas Company, Philadelphia, Pa.
No Drawing. Filed Dec. 14, 1970, Ser. No. 98,059
Int. Cl. C08f 3/64, 3/66, 15/16
U.S. Cl. 260—86.1     5 Claims

ABSTRACT OF THE DISCLOSURE

This invention is concerned with monoethylenically unsaturated acid ester monomers, such as those of acrylic or methacrylic acid, containing a bis-quaternary ammonium halide group, such as one of the formula

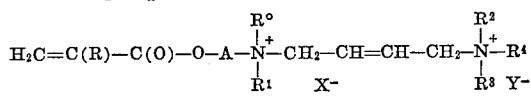

R being H or methyl,
A being $(C_2-C_6)$ alkylene,
$R°$ being lower alkyl,
$R'$ being lower alkyl,
$R^2$ being lower alkyl,
$R^3$ being lower alkyl, $R^4$ being lower alkyl,
X being an anion, and
Y being an anion.

It is also concerned with addition polymers of such monomers, and methods of producing the monomers and polymers. The monomers and polymers are reasonably stable at both alkaline and acid pH values under normal temperature and pressure conditions although capable of reacting with other reactants at the point of unsaturation in the alkenyl linkage between the two quaternary nitrogen groups. The invention also concerns the use of these monomers and polymers as antistatic agents for textiles and other articles formed of hydrophobic materials, as wet-strength agents in making paper and as electroconductive aids in making of various electroconductive papers for electrostatic image reproduction systems.

In accordance with the present invention, there are provided monomers of the following general formula:

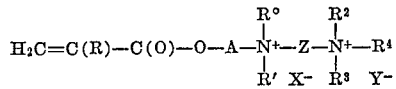

A is $(C_2-C_6)$ alkylene,
R is H or methyl,
$R°$ is lower alkyl, i.e. $(C_1-C_4)$ alkyl,
$R'$ is lower alkyl,
$R^2$ is lower alkyl,
$R^3$ is lower alkyl,
$R^4$ is lower alkyl,
X is an anion, preferably a halide ion,
Y is an anion, preferaby, a haide ion and
Z is —CH$_2$—CH=CH—CH$_2$— or

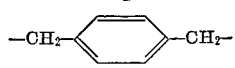

these groups being referred to as (A) and (B) respectivey.

(A) Monomers wherein Z is —CH$_2$CH=CHCH$_2$—, group (A), may be made in various ways. For example they may be made by reacting a (4-halo-2-butenyl)trialkyl-ammonium halide, either the chloride, bromide, fluoride, or iodide, with a dialkylaminoalkyl acrylate or methacrylate. The reaction may be effected in bulk when either of the reactants has a least partial solubility in the other. Alternatively, the reactants may be dissolved in water or other inert solvent such as alcohols, such as ethanol, methanol, isopropanol, isobutanol, benzene, toluene, xylene, acetonitrile, dimethylformamide, acetamide, dimethylacetamide, acetone, dioxane, methyl isobutyl ketone, and mixtures with water even though the other solvent or solvents is not dissolved in water and so on. In some instances reaction may occur at room temperature but generally, it is preferable to heat the mixture of reactants to temperatures of 40° C. up to the reflux temperature of the reaction system which may be as high as 100° to 130° C. or higher. Generally, it is preferred to employ reaction temperatures of 50° to 80° C. The time required to effect the extent of quaternization desired depends, among other things, on the temperature. At room temperature, several days or a week may be needed whereas at reflux, the time required may be only a few minutes to an hour or more. The mixture is preferably stirred continually or continuously. The reactants may be used in an equimolar ratio. However, it may in some instances be desirable to use only a fraction of the full equivalent amount of the quaternary ammonium halide so that only a portion of the dialkylaminoalkyl acrylate or methacrylate is quaternized thereby. On polymerization of the resulting partially quaternized monomer, a copolymer is obtained containing units of unquaternized as well as quaternized monomers. If desired, the reaction product may be recovered by evaporation of water or other solvent or by filtration in certain instances.

When aqueous or alcoholic media are used for the reaction, it may be desirable to maintain the pH of the system at or near 7. This serves to control the speed of reaction and inhibit any hydrolysis of the monomeric ester.

(B) The monomers of Formula I wherein Z is

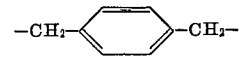

group (B), may be made in various ways. For example, an α(α'-halo-p-xylylene)trialkylammonium halide (made by well-known alkylation procedures, such as reacting in 1:1 mole ratio, a trialkylamine with p-xylene dihalide at room temperature to 40° C. in a solvent, such as acetone, and isolating the product by filtration) may be reacted with a dialkylaminoalkyl acrylate or methacrylate dissolved in an aqueous medium. If it is desired to control the reaction the first-mentioned reactants may be added to the second and the pH may be maintained at about 7 by addition of an inorganic base, such as sodium or potassium hydroxide, if needed. The temperature may be at room temperature to reflux, preferably from 40° to 80° C. Depending on the temperature, the complete quaternization may be effected in a time of a few minutes to several days. At the preferred temperature range, a time of half an hour to 2 or 3 hours is generally adequate. The proportions of the reactants may be equimolar or a lesser proportion of the alkylating agent may be use, if only partial alkylation of the amine is desired. Here again, recovery of the product may be effected by evaporation of solvent or filtration.

Examples of amine-containing compounds that can be alkylated to produce the monomers of Formula I are:

dimethylaminoethyl acrylate or methacrylate
3-(dimethylamino)propyl acrylate or methacrylate
2-(dimethylamino)propyl acrylate or methacrylate
4-(dimethylamino)butyl acrylate or methacrylate
5-(dimethylamino)pentyl acrylate or methacrylate
6-(dimethylamino)hexyl acrylate or methacrylate
2-(dimethylamino)butyl acrylate or methacrylate
3-(dimethylamino)butyl acrylate or methacrylate
2-(dimethylamino)pentyl acrylate or methacrylate
3-(dimethylamino)pentyl acrylate or methacrylate 4-(dimethylamino)pentyl acrylate or methacrylate
2-(dimethylamino)hexyl acrylate or methacrylate
3-(dimethylamino)hexyl acrylate or methacrylate
4-(dimethylamino)hexyl acrylate or methacrylate
5-(dimethylamino)hexyl acrylate or methacrylate
2-methyl-3-(dimethylamino)propyl acrylate or methacrylate
diethylaminoethyl acrylate or methacrylate
dipropylaminoethyl acrylate or methacrylate
dibutylaminoethyl acrylate or methacrylate
diisopropylaminoethyl acrylate or methacrylate For preparing monomers of Formula I in which Z is group (A), examples of alkylating agents that may be used in the method described above are:

4-chloro-2-butenyltrimethylammonium bromide
4-chloro-2-butenyltrimethylammonium chloride
4-chloro-2-butenyltrimethylammonium iodide
4-chloro-2-butenyltrimethylammonium fluoride
4-chloro-2-butenyltributylammonium chloride
4-chloro-2-butenyltriethylammonium chloride
4-bromo-2-butenyltrimethylammonium chloride
4-bromo-2-butenyltrimethylammonium bromide
4-iodo-2-butenyltrimethylammonium fluoride
4-chloro-2-butenyltripropylammonium chloride
4-chloro-2-butenyltriisopropylammonium chloride
4-chloro-2-butenylethyldimethylammonium chloride
4-chloro-2-butenyldiethylmethylammonium chloride
4-chloro-2-butenylethylmethylbutylammonium chloride For preparing monomers of Formula I in which Z is group (B) by the illustrative method described above, examples of alkylating agents that may be used are:

α-(α′-chloro-p-xylylene)trimethylammonium chloride
α-(α′-bromo-p-xylylene)trimethylammonium bromide
α-(α′-chloro-p-xylylene) triethylammonium chloride
α-(α′-chloro-p-xylylene)tributylammonium chloride By the reactions mentioned hereinabove, there are generally obtained monomers of Formula I in which the anions are of halide type. The other quaternary salts and the hydroxide may be obtained, if desired, by subjecting a solution of the bis-quaternary monomer in the halide form to ion exchange using an exchange resin having the appropriate anion that is desired. Examples of various anions for X and Y include nitrate, sulfate, monosodium acid sulfate, chromate, phosphate, methyl sulfate, acetate, formate, oxalate, sulfamate, acrylate, α-methacryloxyacetate, and so on. These conversions to the various salts and the hydroxyl ion form occur at room temperature as well as above it and considerably below it.

The monomers of Formula I are directly useful for copolymerization with acrylonitrile to modify the antistatic, dyeing, and moisture-regain properties thereof. The resulting copolymer containing 0.2 to 5% by weight of the quaternary ammonium compound of the present invention can be formed into fibers which can be formed into textile yarns and fabric which show reduced tendency to develop static charges on frictional contact, better dyeing, especially by acid dyes, and better feel because of increased moisture adsorption or regain. Instead of copolymerizing the monomers of the invention directly with the acrylonitrile to form the main component of fibers or films, a homopolymer or copolymer of the monomer of Formula I with one or more other monomers, such as vinyl acetate, ethyl acrylate, styrene or vinyl benzene sulfonate, may be blended in relatively small amounts with the acrylonitrile polymer which forms the predominant components of the fiber or film that is subsequently formed from the blend.

A compound of Formula I may be used for the treatment of paper to apply a cationic charge to it or to render it electroconductive. A small amount in the range of 0.2 to 5% or more by weight of the compound based on dry fiber weight, may be mixed into the paper pulp in the beater or shortly before or after the pulp leaves the beater. A polymerization initiator may be added to the pulp at the same time or shortly before or after the addition of the monomer of Formula I. The effect obtained in the dry paper may be varied by including other comonomers. For example, there may be used a mixture of monomers comprising about 0.5% to about 95% by weight of at least one monomer of Formula I with a reactive monomer which by reacting with itself and/or with the paper bonds the resulting copolymer to the paper permanently and/or cross-links the copolymer. The amount of such reactive monomer may be about 0.5 to 20% by weight of the monomer mixture. In addition, there may be present up to 99% by weight of the mixture of neutral, or non-ionic comonomers, such as ($C_1$–$C_{18}$)-alkyl acrylates or methacrylates, e.g. ethyl, butyl or methyl acrylate or methacrylate, acrylonitrile, acrylamide, methacrylamide, styrene, vinyl acetate, vinyl chloride, etc. The reactive monomer used may be N-methylolacrylamide or N-methylolmethacrylamide or it may be a monomer containing a vic-epoxy group such as glycidyl acrylate or methacrylate or a monomer containing a quaternary ammonium group, one of the substituents of which is a glycidyl group or is convertible thereto before or after polymerization such as the monomers of Formulas VI and VII of copending United States application Ser. No. 74,499, filed Sept. 22, 1970 and of Formula III of copending U.S. application Ser. No. 813,724, filed April 4, 1969 (as well as a continuation in part thereof Ser. No. 80,144 filed on Oct. 12, 1970) all in the hands of an assignee common to the present application. The monomers of the formulas mentioned are as follows:

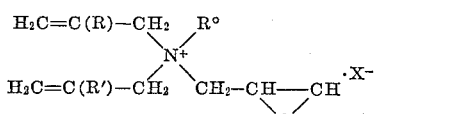

(VI)

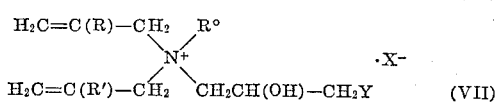

(VII)

wherein R is hydrogen or methyl,
R′ is hydrogen or methyl, and
R° is an alkyl group having 1 to 8 carbon atoms, an aryl group having 6 to 8 carbon atoms or a hydroxyalkyl group having 1 to 8 carbon atoms,
Y is a halogen, such as chlorine, fluorine, bromine or iodine, and
$X^-$ is a halogen, such as chlorine, fluorine, bromine or iodine, and
$X^-$ is an anion such as $F^-$, $Cl^-$, $Br^-$, $I^-$, $OH^-$, $SO_4^=$, $NO_3^-$, $ClO_4^-$, $PO_4^=$, $RSO_3^-$, or $RCOO^-$, R in these instances being a phenyl or a lower alkyl group of 1 to 4 carbon atoms.

(III)

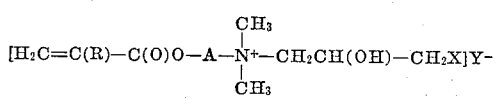

wherein A is a ($C_2$–$C_6$) alkylene group having at least two carbon atoms in a chain between the adjoined O and N atoms or A may be a polyoxyethylene group of the formula $(CH_2CH_2O)_xCH_2CH_2$ wherein $x$ is 1 to 11 or more,
R is hydrogen or methyl,
X is chlorine, bromine, or iodine and
Y is an anion, such as a halogen ion ($Cl^-$, $Br^-$, or $I^-$) or the anion of any other acid, such as phosphate, acid phosphate, sulfate, bisulfate, methyl sulfate, carboxylate, nitrate, sulfonate, sulfamate, acetate, formate, oxalate, acrylate, and α-methacryloxyacetate.

The copolymers containing monomer units of Formula

I herein and a glycidyl group of one of the formulas just mentioned are applied in the same way and under the same conditions as described in the earlier copending applications. Such treated papers may have a sizing effect and often higher wet strength as well as dry strength, the effect varying in dependence on the pH of the treating system.

In either case an aqueous dispersion of neutral or acid-containing polymers such as poly(ethyl acrylate) obtained by emulsion polymerization may also be added to the pulp. In such event the monomer of Formula I, or a polymer formed thereof in situ serves to anchor the additional polymer to the fibers. Instead of such additional polymer, there may be added an aqueous dispersion of a wax, such as polyethylene, of a pigment or mineral filler, or of a material, such as a long chain alcohol-modified urea formaldehyde resin, which on subsequent calendering of the upper paper serves to transparentize it.

The monomeric products of Formula I are polymerizable and for this purpose, their aqueous solutions may be used directly. Any known polymerization initiator of free radical type effective in aqueous systems can be used. Examples are t-butyl hydroperoxide, ammonium persulfate, and alkali metal persulfates, such as those of sodium or potassium. They are used at the customary dosage of 0.1 to 2% by weight, based on monomer weight. They may be used with sodium hydrosulfite or other reducing agents in redox systems. Instead, the polymerization may be effected by radiation.

These new quaternary ammonium salt monomers may be copolymerized with other polymerizable ethylenically unsaturated monomers, especially by emulsion polymerization procedures, using the initiators of redox systems just mentioned in conjunction, if desired, with suitable emulsifiers of nonionic or cationic type. As emulsifiers, there may be used t-octyl- or t-nonyl-phenoxypolyethoxyethanols having from about 10 to 50 or more oxyethylene groups, octadecylamine sulfate, cyclohexyldiethyl(dodecyl)amine sulfate, octadecyltrimethylammonium bromide, polyethoxyamines or mixtures of two or more such emulsifiers.

Any ethylenically unsaturated monomer having a group $H_2C=C<$ may be used for copolymerization with the new monomers of Formula I. Examples of monoethylenically unsaturated monomers having a single $H_2C=C<$ group include $\alpha,\beta$-monoethylenically unsaturated acids, such as acrylic acid, methacrylic acid, itaconic acid, methacryloxypropionic acid, maleic acid, and fumaric acid; vinyl esters of ($C_1$–$C_{18}$) aliphatic acids, such as vinyl acetate, laurate, or stearate; esters of acrylic acid or methacrylic acid with ($C_1$–$C_{18}$) alcohols, including ($C_1$–$C_{18}$) alkanols, benzyl alcohol, cyclohexyl alcohol, and isobornyl alcohol, such as methyl acrylate or methacrylate, ethyl acrylate or methacrylate, butyl acrylate or methacrylate, 2-ethylhexyl acrylate or methacrylate, octadecylacrylate or methacrylate, hydroxyethyl methacrylate, hydroxypropyl methacrylate, methoxyethoxyethyl acrylate or methacrylate, ethoxyethoxyethyl acrylate or methacrylate, methoxyethyl acrylate or methacrylate, ethoxyethyl acrylate or methacrylate; vinyl aromatic hydrocarbons (e.g. styrene, isopropenyl toluene, and various dialkyl styrenes); acrylonitrile, methacrylonitrile, ethacrylonitrile, and phenylacrylonitrile; acrylamide, methacrylamide, ethacrylamide, N-methylol acrylamide, N-monoalkyl and N,N-dialkyl acrylamides and methacrylamides, e.g., N-monomethyl, -ethyl, -propyl, -butyl, and N,N-dimethyl, -diethyl, -dipropyl,-dibutyl, acrylamides, e.g., N-monophenyl- and N,N-diphenyl-acrylamides and -methacrylamides; vinyl ethers, such as butyl vinyl ether; N-vinyl lactams such as N-vinyl pyrrolidone; and olefins, such as ethylene; fluorinated vinyl compounds, such as vinylidene fluoride; $\beta$-hydroxyethyl acrylate or methacrylate, hydroxypropyl acrylate or methacrylate, dimethylaminoethyl acrylate or methacrylate or any of the hydroxyl-containing or amine-containing monomers mentioned in columns 2 and 3 of U.S. Pat. No. 3,150,112; vinyl chloride and vinylidene chloride; alkyl vinyl chloride and vinylidene chloride; alkyl vinyl ketones; e.g., methyl vinyl ketone, ethyl vinyl ketone, and methyl isopropenyl ketone; itaconic diesters containing a single $CH_2=C<$ grouping, e.g., the dimethyl, diethyl, dipropyl, dibutyl and other saturated aliphatic monohydric alcohol diesters of itaconic acid, diphenyl itaconate dibenzyl itaconate, di(phenylethyl) itaconate; allyl and methallyl esters of saturated aliphatic monocarboxylic acid, e.g., allyl and methallyl acetates, allyl and methallyl propionates, allyl and methallyl valerates; vinyl thiophene; 4-vinyl pyridine; vinyl pyrrole; and ethylenically unsaturated monomers containing a quaternary ammonium group, such as methacryloxyethyl trimethyl ammonium chloride and acryloxyethyl trimethyl ammonium chloride.

An alternative method of preparing the polymers of the present invention is to react one or more of the several alkylating agents mentioned hereinabove for introducing the groups (A) and/or (B) (representing Z of the monomers of Formula I) with a polymer containing from 0.25% to 100% by weight of an amine of Formula II or one of its salts.

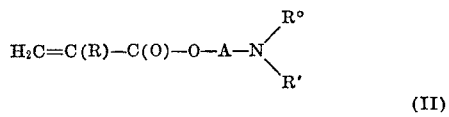

(II)

Numerous methods of polymerizing (including copolymerizing within the meaning of this term) the amines (or their salts) of Formula II are well known and any of these methods may be used. Conventional emulsion, solution, bulk, or suspension polymerization techniques may be employed. Any of the comonomers listed above for copolymerization with the quaternary ammonium compound of Formula I may be used as comonomers with the amines of Formula II or their salts.

The reaction of the alkylating agent or mixture thereof with the polymer may be carried out in the same way and under the same conditions as that of the alkylating agent or mixture thereof with the amine monomer, i.e. in free base form, or in the form of its salt. The polymer, as obtained, may be in the form of a solution in water or a suitable organic solvent or it may be present in the form of an aqueous latex obtained by emulsion polymerization. The alkylating agent is used in the stoichiometric equivalent proportion to convert whatever proportion of amine units in the polymer to quarternary ammonium units that is desired, or an excess up to 100% may be used.

Homopolymers of a compound of Formula I and copolymers containing 25% by weight or more, and preferably containing 60 to 95% by weight, of units derived from one or more monomers of Formula I are generally water-soluble to an extent of at least 1% by weight at room temperature and in most cases dissolve to form aqueous solutions containing as much as 20% or more, the greater the concentration, the greater the viscosity.

The water-soluble homopolymers and copolymers containing 25% by weight or more, and preferably containing 60 to 95% by weight, of units derived from one or more monomers of Formula I are generally useful as flocculants, as in the clarification of water and aqueous suspensions. Thus, the addition to a sewage of about 0.01 to 0.5% by weight, based on the weight of suspended solids, of such a homopolymer or copolymer serves to flocculate the suspended matter and facilitate its removal by filtration or by settling and decantation. These homopolymers and copolymers are thus useful in the flocculation of aqueous suspensions of many types, and especially of domestic and industrial wastes having neutral, acidic or alkaline character. As mentioned hereinbefore, they can be used as paper sizing and wet strength agents and as anchoring agents for other sizing materials applied in aqueous dispersions or suspensions. They are also effective as retention aids in the preparation of mineral filled papers wherein they enhance the anchoring of the filler to the fibers and thereby clarify the white water obtained and improve the efficiency of use of the filler. The sizing and flocculation effects are generally effective at all pH values of the systems to which they are applied.

Copolymers containing from 0.25% to 25% or more by weight of units derived from one or more monomers of Formula I are useful for many purposes. For examples, copolymers of acrylonitrile with 0.25 to 15% of such units are particularly useful for forming fibers and films having improved dyeability, greater resistance to the development of electrostatic charges by frictional contact, and better feel because of greater moisture adsorption. Copolymers of (1) about 0.5% to 30% or more of a monomer of Formula I with (2) up to 15% of acrylic acid, methacrylic acid, or a hydroxyethyl ester thereof and (3) at least one monomer selected from styrene, vinyltoluene, and alkyl esters of the said acids, such as ethyl acrylate, butyl acrylate, 2-ethylhexyl acrylate, methyl methacrylate, are quite satisfactory when applied with a minor amount (5 to 25% by weight based on the weight of the copolymer) of an aminoplast condensate, e.g. that of formaldehyde and urea, melamine, or N,N'-ethyleneurea for the stabilization of wool fabrics against shrinkage or washing, for the bonding of nonwoven fabrics, for the finishing of leather, as a binder for pigmented compositions, for the pigment-dyeing of textiles, for the production of mineral-coated papers, and for lithographic inks, for the sizing of paper, and as thermosetting coatings for application to metals, wood, plastics, glass, masonry of all types, plaster walls, etc. The coatings produced are resistant to the development of static electricity on rubbing.

The homopolymers of a monomer of Formula I, especially those wherein A has 2 to 3 carbon atoms and $R^{\circ}$, $R'$, $R^2$, $R^3$, and $R^4$ have 1 or 2 carbon atoms each, and preferably only 1 carbon atom each, copolymers consisting essentially of two or more such monomers, and copolymers of (a) about 0.5% to 20% by weight or more of one or more reactive monomers as described hereinabove, namely those of Formulae VI and VII of S.N. 74,449 and Formula III of S.N. 813,724 with (b) 80 to 99.5% of one or monomers of Formula I herein or of mixtures of one or more of the Formula I monomers with methacryloxyethyltrimethylammonium chloride or acryloxyethyltrimethylammonium chloride are of special value in providing paper with higher conductivity for use in specialty applications such as electrostatic copy paper, electrographic printing, and other applications where paper, with lower than normal electrical resisitivity is required.

The water-soluble linear homopolymers and copolymers of the present invention may have molecular weights in the range of about 20,000 to 2,000,000 or more. A third group of copolymers may be made by the direct polymerization of the quaternary monomers of types (a) and (b) or their salts. Alternatively, a homopolymer of a di($C_1$–$C_2$)alkylamino($C_2$–$C_3$)alkyl acrylate or methacrylate, such as dimethylaminoethyl acrylate or methacrylate, may be made and this amine-containing polymer may be simultaneously or sequentially quaternized with the components of a mixture of a methyl halide, such as methyl chloride, with one or more of the alkylating agents mentioned hereinabove wherein $R^2$, $R^3$, and $R^4$ each have 1 or 2 carbon atoms, preferably only one, and optionally with epichlorohydrin as a third alkylating agent. To make copolymers of (a) and (b) above, epichlorohydrin and the other alkylating agent or agents are present in the mixture in the proportions to provide 0.5 to 20% by weight of (a) and the balance of component (b) of the copolymer.

When polymers in the lower molecular weight range are desired, the polymerization of the amine, its salt, or its quaternary may be effected at elevated temperatures, e.g. 40 to 60° C. or higher using conventional initiator systems, such as ammonium persulfate with or without sodium hydrosulfite. Alternatively, a chain transfer agent, such as mercaptoethanol, may be used. The higher molecular weight polymers may be obtained at lower temperatures, such as 5 to 10° C. and using concentrations of 60% or more with dilution to facilitate handling as polymerization progresses.

To prepare an electroconductive paper, the Formula I homopolymers and copolymers and the copolymers of (a) and (b) hereinabove defined may be applied to the paper, or cellulosic web, by the conventional methods used for the purpose, e.g., coating, dipping, brushing, or by wet end addition, etc. The paper used may have a basis weight of 30 to 75 lbs., preferably 30–55 lbs. per 3000 sq. ft. The amount of polymer applied to the paper will generally vary within the range of about 1 to 8% (weight) pick-up, depending upon the particular polymer and paper combination used and the degree of electroconductivity which is desired. In some cases, still less might be used. There seems to be no operative upper limit to the amount of polymer applied, except to the extent this is determined by economics. It will therefore be appreciated and understood that the overall range of from about 1% to about 8% pick-up (by weight) is simply a statement of the required amount of polymer to confer electroconductivity properties to the cellulosic web substrate which will adapt it to most commercial uses mentioned above.

As compared to papers made with the water-soluble quaternary ammonium polymers heretofore recommended for improving the electroconductivity of electrostatic reproductive paper, the papers made with certain of the copolymers of the present invention, especially the copolymers containing 0.5 to 30 weight percent of units of Formula I, 0.5 to 20 weight percent of a reactive monomer of the type mentioned hereinbefore such as an N-methylolacrylamide or a monomer containing a glycidyl group, such as glycidyl methacrylate or one of the quaternary ammonium monomers having a glycidyl group attached to the quaternary nitrogen atom, with the balance to make 100% of (meth)acryloxethyltrimethylammonium chloride units have the advantage of retaining their electroconductivity for longer periods of time. This is apparently attributable to the fact that on drying the paper after impregnation or coating thereof with these copolymers, they are cross-linked to a waterinsoluble condition and/or reacted with the cellulose of the paper.

The fact that these copolymers containing reactive groups are somewhat crosslinked and/or reacted with the paper on drying also provides an additional advantage of reducing the tendency to block or eliminating it entirely so that the coated paper carrying the electroconductive material can be rolled on itself without fear of damage when it is unrolled for later use. Also, the crosslinked and/or reacted condition reduces the sensitivity to organic solvents and aqueous media so that the topcoating layers of the photoconductive material such as zinc oxide in a binder dissolved or dispersed in a solvent or in an aqueous medium does not cause any appreciable leaching of the electroconductive agent from the paper at the time of application of the topcoating. Examples of such topcoating layers include styrene-butadiene latices, solutions in an organic solvent or dispersions in water of a polymer containing from 3 to 50% by weight of acid such as a copolymer of styrene and maleic anhydride, a copolymer of 95% butyl acrylate and 5% itaconic acid or of 70% ethyl acrylate and 30% acrylic acid or methacrylic acid, partially hydrolyzed polyvinyl acetate and alkali-soluble cellulose esters such as carboxyethyl cellulose as well as water-soluble cellulose ethers such as hydroxyethyl cellulose. Such topcoating layers contain zinc oxide as well as one of the binders just mentioned and may contain a dye-sensitizer.

To assist those skilled in the art to practice the present invention, the following modes of operation are suggested by way of illustration, parts and percentages being by weight and the temperature in ° C. unless otherwise specifically noted.

(1)(a) To a mixture of 250 g. of acetone and 125 g. of 1,4-dichloro-2-butene in a one-liter reaction flask there is added 59 g. of trimethylamine. The temperature is maintained at 25° C. during the addition. The reaction mixture is allowed to stand overnight; then, 163.9 g. of 4-chloro - 2 - butenyl trimethyl ammonium chloride, a white solid, is removed by filtration.

(b) A mixture of 18.4 g. of 4 - chloro - 2 - butenyltrimethylammonium chloride, 15.7 g. of dimethylaminoethyl methacrylate and 80 g. of water is heated at 68–70° C. for 4.5 hours in a 250 ml. flask. The

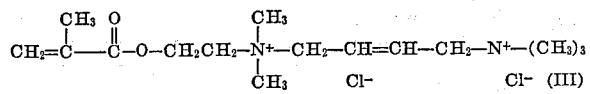

produced is polymerized by the addition, at 65° C., of 1 ml. of a 0.1% solution of $FeSO_4 \cdot 7H_2O$, 0.3 g. of ammonium persulfate and 0.3 g. of sodium hydrosulfite. The temperature is maintained at 65° C. for one hour, then raised to 85° and 0.05 g. of ammonium persulfate and 0.05 g. of sodium hydrosulfite are added. After one hour at 85° C. the solution is cooled to 25° C. to provide polymeric solution of 31.6% solids and a Brookfield viscosity of 22 centipoise. The nuclear magnetic resonance spectrum of the aqueous solution is consistent with the polymeric structure based on Formula III.

(c) Drawdown coatings on 3 x 4 inch glass plates are prepared. In Table I, column 2 lists the actual weight of the film coating measured at 50% relative humidity and colum 3 lists the surface resistivity of these films as measured in a dry-box at 15% relative humidity (ASTM D256–61).

TABLE I
Film on glass plate

| Sample | Weight of film (in mg.) | Surface resistivity (ohms/square) |
|---|---|---|
| Commercial product | 122 | 5.3×10⁸ |
| Above polymer | 131 | 5.3×10⁸ |
| Do | 135 | 7.6×10⁸ |
| Do | 152 | 7.4×10⁸ |

(2)(a) A 2-liter glass polymerization flask is charged with 1000 g. of deionized water and sparged with nitrogen for one hour. The solution is cooled to 15° C. and 138.5 g. of 37% aqueous hydrochloric acid is added, followed by 220 g. of dimethylaminoethyl methacrylate. The temperature rises to 30° C. and the mixture is further warmed to 32° C. Then, 10 ml. of a 0.1 N solution of $FeSO_4 \cdot 7H_2O$, 1.5 g. of ammonium persulfate, and 1.5 g. of sodium hydrosulfite are added. Forty-five minutes after the initial catalyst addition, 0.2 g. of ammonium persulfate and 0.2 g. of sodium hydrosulfite are added. Charges of 0.1 g. of ammonium persulfate and 0.1 g. of sodium hydrosulfite are added 30 minutes later, followed by 0.05 g. of ammonium persulfate and 0.05 g. of sodium hydrosulfite 30 minutes later. The polymer solution at 25° C. has a solids content of 21.7%, a Brookfield viscosity of 55 centipoises, and an amine content of 1.06 milliequivalents per g.

(b) A 200 g. portion of this polymer solution and 36 g. of water are stirred in a glass vessel, and the pH is adjusted to 7.2 with 25% aqueous sodium hydroxide while the solution is warmed to 50° C. Then, 39.0 g. of 4-chloro-2-butenyltrimethylammonium chloride is added in one portion. The reaction temperature is maintained at 50° C. and the pH of the reaction mixture is maintained at 6.8–7.1 by the periodic addition of 25% aqueous sodium hydroxide. At the end of 2 hours, titration indicates that 87% of the amine has been quaternized; another 3.9 g. of 4-chloro-2-butenyltrimethylammonium chloride is then added. After one hour at 50° and 16 hours at ambient temperature, quaternization is complete as indicated by a lack of amine functionality upon acid-base titration. The final polymer solution has a solids content of 32.4% and a Brookfield viscosity of 117 centipoises.

(3)(a) $\alpha$-($\alpha'$-chloro-p-xylylene) trimethyl ammonium chloride is prepared by adding 34 g. of trimethylamine chloride to 100 g. of p-xylylene dichloride in 200 g. of acetone. The product, 137 g. is isolated by filtration.

(b) To 200 g. of the poly(dimethylaminoethyl methacrylate hydrochloride) prepared in (2) above there is added 25% aqueous sodium hydroxide until the pH rises to 7.0. The solution is warmed to 60° and 36.9 g. (0.77 equivalent) of the $\alpha$-($\alpha'$-chloro-p-xylylene)trimethylammonium chloride is added. The pH of the solution is maintained at 7.0 by the addition of 25% aqueous sodium hydroxide. After 70 minutes, quaternization of the amine is 77% complete; 13 g. (0.23 equivalent) of the above ammonium salt is added, the pH adjusted to 8.5, and the reaction mixture set aside for 3 days. The finished polymer solution, whose pH is adjusted to 6.0 with hydrochloric acid, has a solids content of 33.2% and a Brookfield viscosity of 157.7 centipoises.

(c) The polymers of (2)(b) and (3)(b) are tested as conductivity aids for electroconductive paper in the following way and the results are reported in Table II.

One part of the polymer to be tested, one part of a hydroxyethylated starch available commercially under the name Pen Gum 280, and one part of kaolinite clay are mixed to produce a 30% solids mixture. This formulation is applied at various levels to a paper base stock (40 lb./3000 sq. ft. paper made from bleached pulp beaten to a Canadian Standard Freeness of 200 ml.) typical of that used for Electrofax® copy paper by means of wire wound rods, and dried for one minute at 180° F. Surface resistivity at 15% relative humidity is measured using ASTM Method D256–61.

TABLE II

| Conductivity aid | Conductivity aid, lbs./3,000 sq. ft. paper | Surface resistivity, ohms/square |
|---|---|---|
| Polymer of (3)(b) | 1.5 | 4.8×10¹⁰ |
| Do | 2.0 | 4.2×10¹⁰ |
| Do | 2.75 | 3.5×10¹⁰ |
| Polymer of (2)(b) | 1.5 | 6.5×10⁹ |
| Do | 2.0 | 5.2×10⁹ |
| Do | 2.75 | 3.9×10⁹ |
| Commercially available product | 1.5 | 4.9×10⁹ |
| Do | 2.0 | 4.3×10⁹ |
| Do | 2.75 | 3.6×10⁹ |
| None (untreated paper) | | 1×10¹⁴ |
| Second commercial product | 1.5 | 2.6×10⁹ |
| Do | 2.75 | 1.4×10⁹ |

(4) Glass plates are coated with about 100 mg./10 sq. in. of resin and the surface resistivity is measured in a dry-box at 15% relative humidity as described in (1)(c). Results obtained are given in Table III.

TABLE III

| Polymeric resins of— | Log, surface resistivity | Number of determinations |
|---|---|---|
| (1)(b) (Z is (A)) | 8.84 | 4 |
| (2)(b) (Z is (A)) | 8.45 | 5 |
| (3)(b) (Z is (B)) | 9.56 | 6 |
| Commercial product | 8.74 | 14 |
| Second commercial product | 8.81 | 8 |

(5)(a) To a mixture of 100 g. of methyl isobutyl ketone and 500 g. of 1,4-dichloro-2-butene, 248.5 g. of anhydrous trimethylamine is added over one hour while the temperature of the reaction mixture is maintained below 65° C. with external cooling. The mixture is stirred 2 hours after the addition of the amine; a 1000 g. portion of water is added, and the resulting mixture is stirred thoroughly. The upper, methyl isobutyl ketone layer is allowed to separate, removed, and discarded.

(b) A solution of poly(dimethylaminoethyl methacrylate) is prepared by heating a mixture of 1000 g. of methyl isobutyl ketone, 100 g. of dimethylaminoethyl methacrylate and 0.5 g. of azobisisobutyronitrile (AIBN) to 95° C., and adding over 2 hours a mixture of 900 g. of dimethylaminoethyl methacrylate and 5.5 g. of AIBN. The temperature of the reaction mixture is maintained at 95° C. throughout the addition and for 2.5 hours thereafter. A 1.0 g. portion of AIBN is added 30 minutes after the monomer addition is complete, and a 0.5 g. portion of AIBN is added one hour later. The cooled polymer solution has a Brookfield viscosity of 115 centipoises.

(c) A 1070 g. portion of this polymer solution (part (b) hereof) is added to the aqueous solution prepared in part (a) hereof. Another 1000 g. of water is added, and the mixture is heated to 55–60° C. After 5 hours, quaternization is essentially complete as determined by acid-base titration. The methyl isobutyl ketone layer is separated and discarded, and the aqueous solution is air-sparged at 60° C. and 20 mm. pressure for one hour. The resulting polymer solution has a solids content of 55.6% and a Brookfield viscosity of 1400 centipoises.

(6) Procedure (1)(b) is repeated six times except that in each instance the amine is replaced by a molar equivalent amount of a different one of the following amines:

(a) 3-(dimethylamino)propyl acrylate
(b) 2-(dimethylamino)propyl methacrylate
(c) 2-(dimethylamino)hexyl methacrylate
(d) 4-(dimethylamino)butyl acrylate
(e) 2-(diethylamino)ethyl acrylate
(f) 2-(dibutylamino)ethyl methacrylate (7) Each of the polymer solutions obtained in (6) above is diluted with water to a concentration of 27% and samples of nylon fabric are immersed in the resulting solutions, and then dried in air. The resulting fabrics are improved in resistance to accumulation of electric charges on rubbing as compared to a sample of the same fabric but untreated.

(8) Each of the polymers of (6) above is formulated with hydroxyethylated starch and kaolinite clay and applied to paper as in (3)(c) above. The resulting papers show reduced resistivity and can be used as electrostatic reproductive papers.

(9) Each of the polymer solutions obtained in (6) introduced into separate portions of a digested sewage sludge containing 10 grams of suspended matter of predominantly organic character per 100 cc. volume and having a pH of 7.4. The amount of solution introduced is such as to provide 0.25 g. of polymer solids per 100 g. of suspended solids in the sewage sludge to which it is added. The suspended matter is flocculated and the speed of filtration of the sludge is markedly enhanced.

(10) A reaction vessel similar to those previously described but provided with four addition funnels (a, b, c, and d) is charged with 632 g. of H$_2$O and 2 ml. of 0.1% FeSO$_4$ solution. This solution is heated to 70° C. and purged with nitrogen. The supply containers of the addition funnels are charged in the following manner: (a) a solution of 2.0 g. of ammonium persulfate in 50 g. of H$_2$O (b) 2.0 g. of sodium metabisulfite dissolved in 50 g. of H$_2$O; (c) a monomer mixture of 90 g. of dimethylaminoethyl acrylate and 100 g. of methyl acrylate; and (d) 67.2 g. of 37% hydrochloric acid. The kettle is then primed with 7 ml. of the HCl solution and 5 ml. of the initiator solution. All the remaining solutions are gradually added over a 1-hr. period such that the temperature is maintained between 69 and 71° C. An additional 10 g. of dimethylaminoethyl acrylate is then added over a 5-min. period. The completed solution polymer has a pH of 3 at 23.7% solids. A 300 g. sample of this solution is diluted with 100 g. of H$_2$O and adjusted to pH 7 by addition of 25% NaOH. Then as 38.5 g. of (4-chloro-2-butenyl)trimethylammonium chloride is added, the pH is maintained at 7 by addition of 25% NaOH. After 18 hours at 25° C., amine titer confirms complete quaternization of the copolymer.

The copolymer thus obtained is useful in the flocculation of suspended solids as in procedure (9) above, and in the antistatic treatment of hydrophobic textiles as in procedure (7) above.

(11) The papers obtained in (3)(c) are given a dielectric coating layer by topcoating with the following formulation:

| Material: | Parts |
|---|---|
| Ammonium salt of a copolymer of 50% butyl acrylate, 25% methyl methacrylate, 10% styrene, and 15% methacrylic acid (35% aqueous solution) | 57.2 |
| Copolymer of 32% ethyl acrylate and 68% methacrylic acid (20% aqueous dispersion) | 1.25 |
| Photoconductive ZnO (Photox 801) | 140 |
| Bromophenol Blue in methanol (½% solution) | 5.6 |
| Ammonium hydroxide (28%) | 0.8 |
| Water | 27.1 |

This coating is applied at 15 lb./3000 sq. ft. and air-dried. The polymers containing the quaternary ammonium groups of Formula I show reduced migration into the dielectric coating and a better image is produced on reproduction than those made with the commercial products mentioned.

(12)(a) There is charged to a glass reaction vessel 1200 g. of water, 40 g. of a 70% sholution of tert-octylphenoxypoly(40-ethoxyethanol and 8 g. of sodium metabisulfite. This solution is purged with nitrogen and heated to 55° C. Three adidtion funnels (a, b, c) are charged as follows: (a) with a mixture of 120 g. of butyl acrylate and 120 g. of styrene, (b) with 160 g. of the bis-quaternary monomer obtained in (1)(b) above, and (c) with 8 g. of ammonium persulfate dissolved in 90 g. of water. The solutions are added concurrently over 1 hours while the temperature is maintained at 55–60° C. for this time and for one hour thereafter.

(b) Part (a) is repeated six times except that the monomeric bis-quaternary compound therein used is replaced by the following bis-quaternary monomers in the amounts stated:

(1) 180 g. of the bis-quaternary obtained in (6)(a) above,
(2) 200 g. of the bis-quaternary obtained in (6)(b) above,
(3) 120 g. of the bis-quaternary obtained in (6)(c) above,
(4) 80 g. of the bis-quaternary obtained in (6)(d) above,
(5) 60 g. of the bis-quaternary obtained in (6)(e) above,
(6) 10 g. of the bis-quaternary obtained in (6)(f) above,
(7) 5 g. of the bis-quarternary obtained in (6)(a) above.

(c) The copolymers obtained in parts (a) and (b) are applied to nylon textile fabrics by the procedure of (7) above to provide an antistatic finish thereon.

The copolymers of part (a) and parts (b)(1), (b)(2), (b)(3), (b)(4), and (b)(5) are effective flocculants when applied at levels of 0.25 to 0.5%, based on suspended solids, to digested sewage sludges as in procedure (9).

(13)(a) To 25 g. of dimethylaminoethyl methacrylate in 140 g. of isopropyl alcohol is added 37.2 g. of α-(α'-chloro-p-xylylene)trimethyl ammonium chloride, and the mixture is warmed to 60° C. In one hour, the amine is 69% quaternized and the solution is clear. Within the next hour, a copious white precipitate of $$\begin{bmatrix} & CH_3 & O & & CH_3 & & \\ CH_2{=}C{-}C{-}O{-}CH_2CH_2{-}N^+{-}CH_2{-}\phantom{XX}\langle\phantom{X}\rangle{-}CH_2{-}N^+{-}(CH_3)_3 \\ & & & CH_3 & Cl^- & & Cl^- \end{bmatrix}$$

forms. This hygroscopic solid is isolated by filtration and stored in a dessicator until used in an aqueous solution polymerization as described in (1)(b).

(b) The procedure of part (a) is repeated three times with the amount stated of a different one of the following monomer amines:

(1) 200 g. of 3-(dimethylamino)propyl acrylate
(2) 220 g. of 3-(dimethylamino)butyl methacrylate
(3) 230 g. of 5-(dimethylamino)pentyl acrylate

(14) Each of the monomers of (13)(a) and (13)(b) parts (1) through (3) are homopolymerized by the polymerization procedure of (1)(b). The polymers are used as antistatic agents in procedure (7), flocculants in procedure (9) and as conductivity aids in the making of electrostatic reproduction papers as in procedure (3)(c) followed by (11).

15) Copolymers are produced by procedure (12)(a) hereinabove except that the bis-quaternary monomer used therein is replaced by the amount hereinafter stated of a respective one of the following bis-quaternary monomers:

(1) 65 g. of the bis-quaternary monomer obtained in (13)(a).
(2) 150 g. of the bis-quaternary monomer obtained in (13)(b)(1).
(3) 180 g. of the bis-quarternary monomer obtained in (13)(b)(2).
(4) 220 g. of the bis-quaternary monomer obtained in (13)(b)(3).

(16) Each of the polymer solutions obtained in (14) and (15) above is formulated with hydroxyethylated starch and kaolinite clay and applied to paper as in (3)(c) above. The resulting papers show reduced resistivity and after topcoating with a dielectric layer, such as that described in (11) hereinabove can be used as electrostatic reproductive papers.

(17) Each of the polymer solutions obtained in (14) and (15)(4), above is formulated with hydroxyethylated starch and kaolinite clay and applied to paper as in (3)(c) above. The resulting papers show reduced resistivity and after topcoating with a dielectric layer, as in (11) above can be used as electrostatic reproductive papers.

(18)(a) To 500 g. of methyl isobutyl ketone containing 250 g. of 1,4-dichloro-2-butene there is added 118 g. of trimethylamine; the temperature is controlled at 55–60° C. with external cooling. When precipitation of the 4-chloro-2-butenyl trimethylammonium chloride is complete, 500 ml. of water is added, and the methyl isobutyl ketone layer is separated. The aqueous layer is added to 628 g. of a 50% solution of poly(dimethylaminoethyl methacrylate) prepared as in (5)(b), and the mixture is warmed to 60° C.; 84.6% of the amine is quaternized as determined by titration for amine functionality. The pH of the reaction mixture is adjusted to 6.0 with aqueous hydrochloric acid, and 30.5 g. of epichlorhydrin and 200 g. of water are added. After 4 hours at 60° C., quaternization of the amine functionality of 99% complete. The pH of the mixture is adjusted to 2.0 with aqueous hydrochloric acid, the methyl isobutyl ketone layer is removed, and the aqueous phase is stirred at 55° C. under 100 mm. Hg pressure while a slow air stream is passed beneath the surface. The final aqueous polymer solution has a pH of 2.2, a solids content of 48.3%, and a Brookfield viscosity of 1600 cps.

(b) The polymer obtained in part (a) hereof is a copolymer of about 85 percent of units of the formula $$\begin{bmatrix} & CH_3 & & & & \\ -H_2C{-}C{-} & & CH_3 & & \\ & | & & |^+ & & \\ & O{=}C{-}O{-}CH_2CH_2{-}N{-}CH_2CH{=}CH{-}CH_2{-}N^+({-}CH_3)_3 \\ & & & | & & \\ & & & CH_3 & & \end{bmatrix} 2(Cl^-)$$

and about 15 percent of reactive units of the formula $$\begin{bmatrix} & CH_3 & & & \\ -H_2C{-}C{-} & & CH_3 & \\ & | & & |^+ & \\ & O{=}C{-}O{-}CH_2CH_2{-}N{-}CH_2CH(OH)CH_2Cl \\ & & & | & \\ & & & CH_3 & \end{bmatrix} Cl^-$$

At the low values of pH (6 or less) the copolymer is reasonably stable for considerable periods of time. It is quite useful as a wet strength resin for paper. For example, 2 parts of the 48.3% solution may be added to 10,000 parts of a 1% fiber-solids bleached kraft pulp slurry at a pH of 7.8 (beaten to a Canadian Standard Freeness of 470 ml. at 2.5% solids). The pulp is then diluted to a consistency of 0.05%, formed into a sheet, and dried at 200° C. for two minutes. Improved wet strength is obtained.

A markedly increased wet strength is obtained if the polymer solution of part (a) hereof is adjusted to a pH of 11 with 14% aqueous NaOH and allowed to stand for about 4 to 6 hours before it is added to the pulp. Under these conditions the 2-hydroxy-3-chloro-propyl group of the reactive units are largely converted to glycidyl groups.

(c) A sheet of paper of the type mentioned in (3)(c) above is coated with a 30% solids mixture made as described in (3)(c) except that the polymer used is that of (a) hereof allowed to stand for 4 hours at a pH of 11 as described in the last preceding paragraph. The amount applied is such that, after drying for 1 minute at 180° F., the coating is about 3½ lb. per 3000 sq. ft.

The coated paper can be rolled upon itself without blocking and unrolled without damage.

(d) The paper obtained in part (c) hereof is topcoated with a dielectric layer by applying the topcoating composition of 11 hereinabove at 15 lb./3000 sq. ft. and air-drying. There is little or no migration of polymer from the first coat into the topcoat and a good image is produced on electrostatic reproduction.

We claim:
1. A compound of the formula:

$$H_2C{=}C(R){-}C(O){-}O{-}A{-}\underset{R'}{\overset{R^\circ}{N^+}}{-}Z{-}\underset{R^3}{\overset{R^2}{N^+}}{-}R^4 \qquad (I)$$
$$X^- \qquad\qquad Y^-$$

wherein
A is $(C_2{-}C_6)$-alkylene,
R is H or methyl,
R° is lower alkyl,
R' is lower alkyl,
$R^2$ is lower alkyl,
$R^3$ is lower alkyl,
$R^4$ is lower alkyl,
$X^-$ is an anion,
$Y^-$ is an anion, and
Z is $-CH_2-CH{=}CH-CH_2-$ or $$-CH_2-\langle\phantom{XX}\rangle-CH_2-$$

2. A compound as defined in claim 1 in which X⁻ is a halogen or nitrate ion and Y⁻ is a halogen or nitrate ion.

3. A polymer of a compound of claim 1.

4. A copolymer of (1) about 0.25% to 99.5% by weight of a compound of claim 1 with (2) at least one other monoethylenically unsaturated monomer having a group of the formula $H_2C=C<$.

5. A copolymer of 0.25 to 30% by weight of a compound of claim 1 with the balance to make 100% of (acryloxyethyl) or (methacryloxyethyl)trimethyl ammonium chloride.

References Cited
UNITED STATES PATENTS

| | | | |
|---|---|---|---|
| 2,729,577 | 1/1956 | Bacon et al. | 260—89.5 N |
| 3,108,979 | 10/1963 | Le Fevre et al. | 260—89.5 N |
| 3,186,973 | 6/1965 | Maeder | 260—86.1 N |

HARRY WONG, JR., Primary Examiner

U.S. Cl. X.R.

8—55; 96—1.5; 117—124, 128.4, 138.8, 139.5, 140, 142, 145, 48, 155, 161, 169; 162—158, 164, 168